United States Patent [19]

Winter

[11] Patent Number: 4,549,801
[45] Date of Patent: Oct. 29, 1985

[54] AUTOMATIC FOCUSSING CAMERA WITH AUTOMATIC APERTURE SETTING

[75] Inventor: Arthur J. Winter, Encino, Calif.

[73] Assignee: W. Haking Enterprises Limited, North Point, Hong Kong

[21] Appl. No.: 474,782

[22] Filed: Mar. 21, 1983

[51] Int. Cl.$^4$ .......................... G03B 3/00; G03B 15/05
[52] U.S. Cl. ..................................... 354/403; 354/415; 354/419; 354/421; 354/423
[58] Field of Search ................. 354/25 R, 25 A, 25 P, 354/25 N, 31, 43, 44, 32–35, 196, 145, 145.1, 195.11, 403, 412, 415, 419, 421, 430, 433, 448, 405

[56] References Cited

U.S. PATENT DOCUMENTS

| | | | |
|---|---|---|---|
| 3,547,017 | 12/1970 | Harvey | 354/415 |
| 4,103,152 | 7/1978 | Stauffer | 354/405 X |
| 4,194,819 | 3/1980 | Ito et al. | 354/448 |
| 4,300,823 | 11/1981 | Yamanaka et al. | 354/403 |
| 4,357,083 | 11/1982 | Johnson et al. | 354/415 X |

FOREIGN PATENT DOCUMENTS

| | | | |
|---|---|---|---|
| 168640 | 12/1981 | Japan | 354/33 |
| 951248 | 3/1964 | United Kingdom | 354/25 |

Primary Examiner—William B. Perkey
Attorney, Agent, or Firm—Stephen R. Arnold; Russell E. Hattis

[57] ABSTRACT

An electrically operated flash camera employs an infrared pre-flash reflected light signal stored in a single memory storage to control focus and aperture. Two comparators serve to govern both operations, sensing potentiometrically derived analog position indicating signals representing lens position and aperture setting as the lens and aperture control elements are scanningly driven through their ranges of settings. Comparison of these analog signals with the stored signal is used to terminate scanning to set focus and aperture. A visible light photosensing means controls aperture and inhibits the exposure flash if ambient illumination is adequate.

22 Claims, 5 Drawing Figures

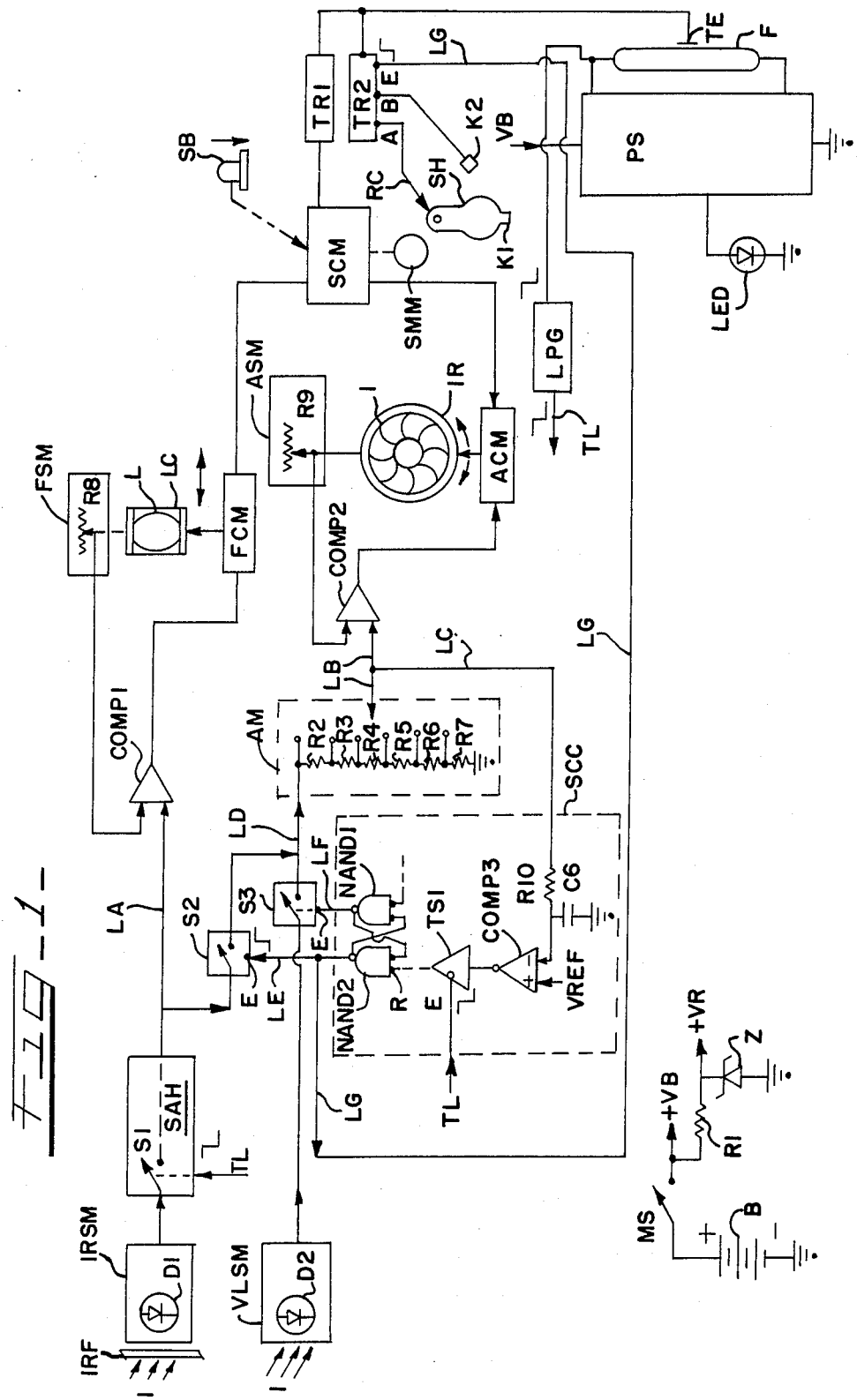

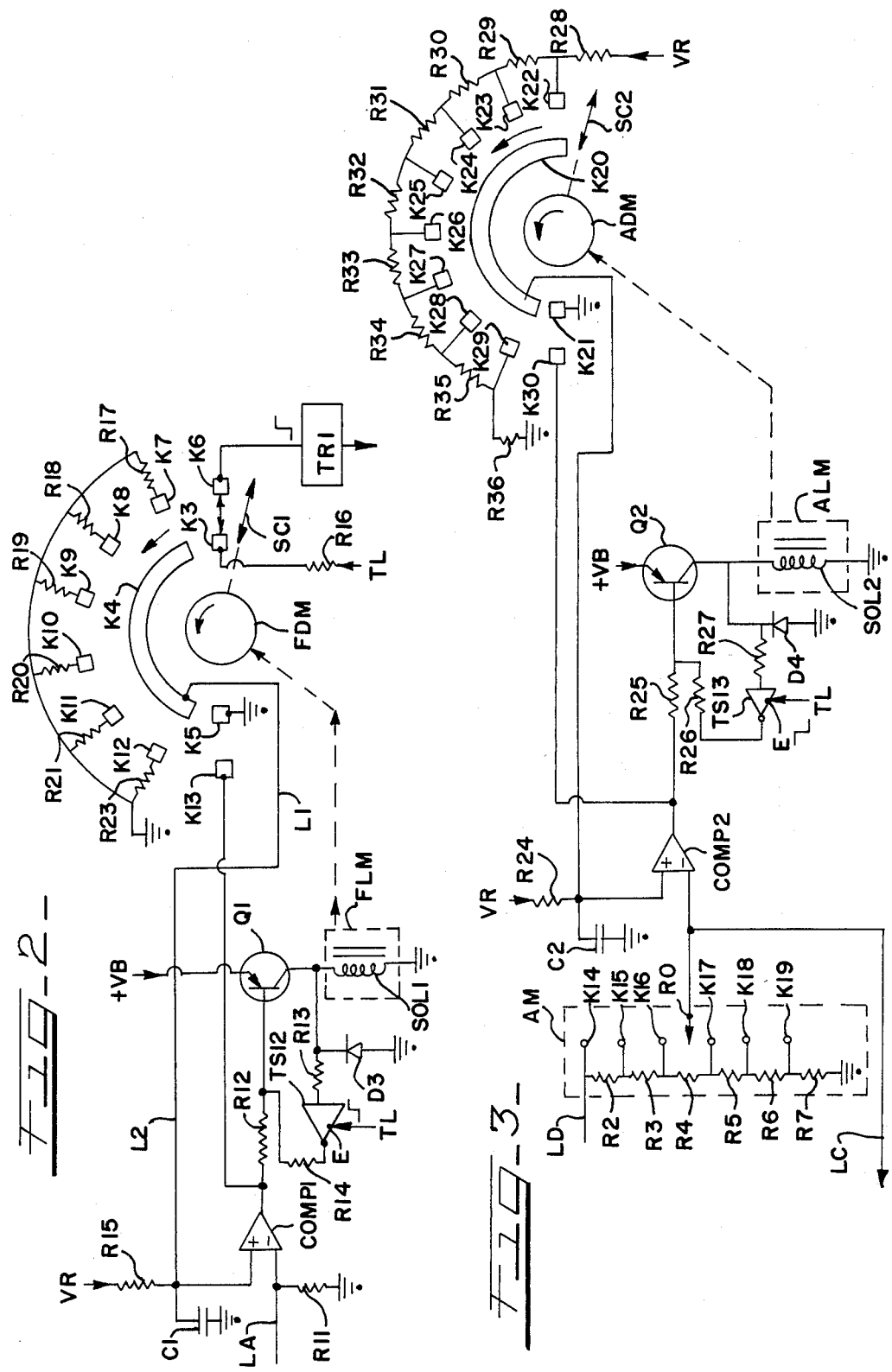

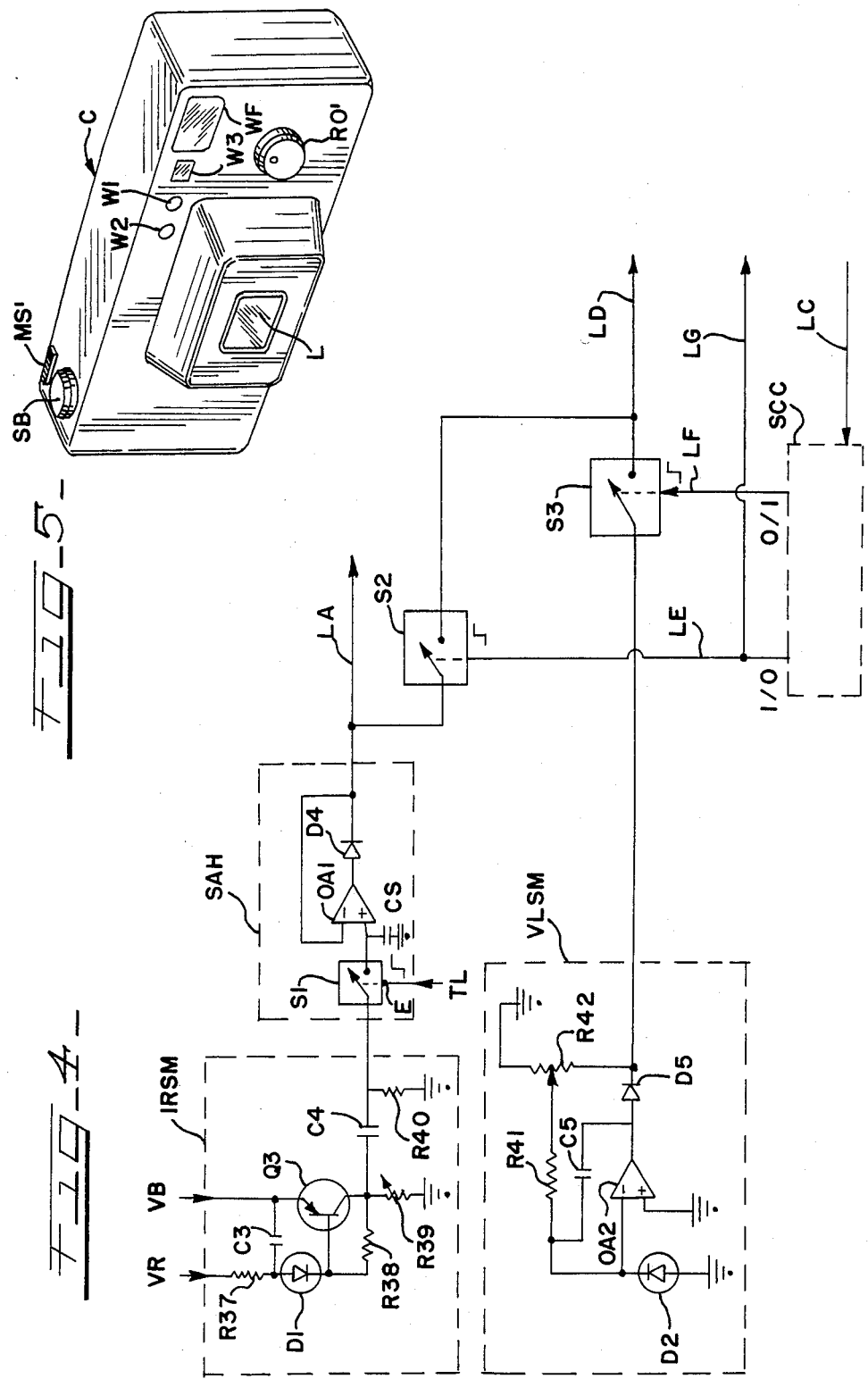

AUTOMATIC FOCUSSING CAMERA WITH AUTOMATIC APERTURE SETTING

TECHNICAL FIELD OF THE INVENTION

The technical field of the invention is electrically operated still cameras having automatic focus and aperture setting controls.

BACKGROUND OF THE INVENTION

A variety of automatic focussing and automatic aperture setting cameras are known which energizes a flash lamp to provide a first generally low intensity flash of light initiated as the shutter release button is depressed. The flash light is reflected from the object to be photographed and detected by a photosensing means which provides a signal indicative of the range to the object to be photographed. This range signal has been used to adjust the position of the focussing leans, and it has been proposed to automatically set the lens aperture in response to this range signal for a flash picture at the range involved if flash operation was selected. The flash lamp is then again automatically energized to provide a high intensity flash of light as the shutter opens in response to the same shutter release button depression which produced the range determining flash of light.

As disclosed in the applicant's U.S. Pat. No. 4,473,285 issued Sept. 25, 1984, which fully discloses only the lens focussing portion of such a camera, the range signal is applied to individual signal level detectors which are set to be triggered by range signals which exceed different levels of progressively decreasing magnitude representing the limits of contiguous range zones starting with the closest range zone and ending with the next farthest range zone. Three such zones are utilized in the camera disclosed in this application, making a total of four range zones overall. Accordingly, a signal generated by a range light pulse reflected from an object in the nearest range zone will actuate all of the level detectors involved and signal generated by a light pulse reflected from an object at a range within the furthest range zone will not operate any of the level detectors. Focussing means respond to the absence of any triggered signal level detector by focussing the camera in the farthest range zone and responds to the triggered signal level detector associated with the nearest range zone to focus the camera for that range zone.

While the focussing system just described is very satisfactory for a limited number of range zones where a few signal level detectors and associated focus control circuitry are utilized, this approach becomes uneconomic where a large number of range zones are utilized, and particularly where the range zone signals are also utilized for automatic lens aperture control during flash operation. As is well known for flash operation the lens speed is fixed and different lens apertures or "f-stops" are selected depending on the camera to object distance. If lens aperture selection is determined by utilizing an "f-stop" value zone approach like the focussing zone system just described, an additional group of signal level detectors and associated aperture control circuitry is required since there would normally be different range transition zones for focussing and lens control. Where a large number of range and aperture control zones are involved, as required for best picture taking results, the expense of the signal level detector and associated circuitry makes a signal level detector system as described undesirable from an economic standpoint.

SUMMARY OF THE INVENTION

According to a feature of the invention, automatic camera focussing and aperture setting may be most economically achieved for any arbitrary number of zone settings by use of a single sample-and-hold circuit to store and thereafter provide a range control signal related to the reflected intensity of the object reflected range-determining flash of light which precedes the exposure flash, for both focus control and lens aperture control for flash pictures. The lens focus and lens aperture setting means of the camera may include rotary mounted control shafts coupled to the movably mounted focussing lens and aperture-forming means to transmit a drive force thereto supplied by spring drive means which are tensed when the shafts are in an initial, cocked and latched reference position, where the focus distance is at a given furthest or nearest range position and the aperture setting is at a corresponding largest or smallest aperture setting. Upon depression of the shutter release button, the control shafts are released so that the focussing lens and aperture-forming means are progressively moved. Such a setting and drive means for the focussing lens are disclosed in my copending application Ser. No. 325,337, now U.S. Pat. No. 4,473,285, which is herein incorporated by reference.

In accordance with the present invention, analog position-indicating signals are generated which correspond to the instantaneous focussing lens positions and aperture stop settings. These position-indicating signal generating means are referred to herein as position-indicating means. They are preferably a pair of tapped potentiometers having their scanning contacts respectively driven in synchronism with the movement of the associated lens focussing and aperture setting means. Each tap thereof provides on such movable contact engaging the same a voltage corresponding to the range signal voltage which would be stored in the sample-and-hold circuit for the range requiring the desired focussing lens position or aperture stop setting present when the movable contact engages the potentiometer tap involved. While the focussing lens and lens aperture setting elements theoretically could be custom designed to be ganged together to share the same potentiometer or other position-indicating means, this would be too expensive and difficult to achieve as a practical matter. The changing signals on the movable contact of each potentiometer (or the output of different position-indicating means where potentiometers are not used) is compared with the range signal stored in the sample-and-hold circuit by a signal comparison circuit and, when there is a comparison between the two signals, the movement of the control shaft which drives the associated potentiometer contact and focussing lens or lens aperture varying means is terminated. The lens aperture is thus set to produce a properly focussed and properly exposed, flash picture of an object at the range indicated by the range signal involved. (The signal comparison means and the means which terminates said control shaft movements are together sometimes referred to as lens or aperture setting terminating means.)

In accordance with another aspect of the present invention, the aperture setting portion of the camera just described is also used to set the lens aperture under ambient light conditions when flash light is not needed. To this end, ambient light sensing means is provided which establishes a control signal indicative of the ambient illumination of the object to be photographed. Control means are provided responsive to an ambient light intensity indicating control signal indicating a relatively low ambient light condition where there is need for flash lamp illumination for rendering the associated signal comparison circuit responsive to the stored signal of the sample-and-hold circuit so that the aperture setting is determined by the range of the object to be illuminated by flash light. On the other hand, if the ambient light intensity indicating control signal indicates that there is sufficient ambient illumination requiring no flash light illumination, the control means renders the associated signal comparison circuit responsive to the output of the ambient light sensing means, so that the aperture setting is determined by the ambient light conditions and not the object range.

In accordance with another feature of the invention, the same lens operating potentiometer or other position-indicating means is used for flash light or ambient light picture taking operation of the camera. To enable the use of the same potentiometer control or other position-indicating means for lens aperture control for ambient light or flash illumination, the ambient light sensing means must produce an ambient light intensity indicating control signal which has the same value as the stored range-indicating sample-and-hold circuit signal requiring an aperture setting for flash illumination which corresponds to the setting required for the level of ambient illumination involved. A sample-and-hold circuit for focussing and/or aperture control is disclosed in United Kingdom Published Patent Application GB 2084750A. This patent application, however, discloses the use of such means to disable to a light photosensing system used during an exposure evaluation phase to terminate film exposure (Page 6, Lines 66–75). The function of such a circuit in the above-referenced system is not to capture and hold the flash pulse, but to block it from interfering with a concurrent exposure integration system. Also, while other prior cameras may use a sample-and-hold circuit to store an integrated or peak value of an object reflected range determining flash of light, the output of such a circuit was not used in the manner of the present invention previously described.

The above and other features and advantages of the invention will become apparent upon making reference to the specification to follow, the drawings and the claims.

DESCRIPTION OF DRAWINGS

FIG. 1 is a functional block diagram of the principal control systems of a camera having automatic focussing and aperture control;

FIG. 2 is a schematic circuit diagram of the focussing control system;

FIG. 3 is a schematic circuit diagram of the aperture control system;

FIG. 4 is a schematic circuit of a pre-flash light sensing and pulse storage circuit, an ambient light sensing circuit, and selective analog switching circuit actuated to connect them alternatively to govern the aperture setting; and FIG. 5 is a perspective view of a representative camera for using the above-mentioned circuits, showing the principal controls and optical elements.

DETAILED DESCRIPTION OF THE INVENTION

FIG. 1 shows principally in functional block diagrams of the principal elements of the control systems for a camera having automatic focus and aperture control. Overall system control is exercised through a system control means SCM controlling the sequence of the various circuits and other control elements of the system. A focus control means FCM responsively actuated by the system control means SCM serves to move a lens cell LC (lens focussing means) containing at least one of the elements of the image focussing lens L of the camera over a range of positions to accommodate varying subject to camera distances. An aperture control means ACM similarly responsive to the system control means SCM controllably actuates the aperture stop member of the system, here schematically represented by an iris I controllably settable to varying aperture values by actuation of an aperture setting means, here functionally shown as a rotatable iris control ring IR. The aperture control means serves to set the aperture of the system to an appropriate value responsively to actuation by the system control means, and to other control signals. A variety of conventional aperture setting means other than a controllable iris may equally well be employed, as for example a rotatable disc with a series of peripherally disposed aperture-defining holes of progressively varying size.

A power supply PS supplies power to fire a flash tube F, the trigger signal being derived from a first trigger circuit TR1 actuated responsively to commands from the system control means SCM to provide a ranging pre-flash of light to illuminate the scene to be photographed. The flash tube F is optionally actuated a second time responsively to a second and subsequent trigger pulse from a second trigger circuit TR2, and the shutter SH is actuated by a shutter motor means SMM after focus and aperture have been set. As will subsequently be described, the second flash is disabled if ambient illumination is adequate. A visible light sensing means VLSM provides an output signal indicative of the level of ambient illumination before the pre-flash operation and is used to disable the main flash if it is not needed for exposure.

A pre-flash sensing means, preferably responsive only to infrared through employment of an interposed infrared filter IRF, senses the strength of the light returned from the scene when illuminated by the pre-flash pulse. As is well-known in the art, since the infrared reflectively of most objects is surprisingly uniform, irrespective of visual color or shading, the reflected infrared light amplitude may be used to determine the distance from camera to subject. This signal is stored in a sample and hold circuit SAH, here schematically indicated by an analog switch S1 actuatable via a timing line TL to an open or closed condition. The sample and hold circuit SAH is energized to a hold or storing condition preferably somewhere near the peak of the reflected pre-flash light pulse. A signal corresponding to this stored pulse value is fed via the line LA through a comparator COMP1 to actuate the focus control means FCM to set the lens L to a focussing position related to the strength of the reflected pre-flash light pulse, so that the lens is properly focused for the camera to subject distance, the setting thus being derived from the received strength of the reflected light pulse during pre-flash.

The aperture setting is also derived either from the infrared sensing means pre-flash signals stored in the sample hold circuit SAH or alternatively from the visible light sensing means VLSM, according to whether main flash illumination is necessary or not. To simplify the circuitry, the signal level stored in the sample-and-hold circuit SAH for a given object distance requiring a given lens aperture setting for flash illumination is arranged to be the same signal level produced by the visible light sensing means VLSM for an ambient illumination requiring the same lens aperture. This aspect of the system will be discussed in detail further on.

The decision as to which element will be used to control the aperture setting is derived from the magnitude of the ambient light sensing means signal received from the visible light sensing means VLSM. To accomplish this, two analog gates S2 and S3, here functionally shown in the form of externally actuatable switches, are selectively controlled by a sensing control circuit SCC which has the property of controlling switches S2 and S3 such that when one is open the other is invariably closed. As will subsequently be explained, the system logic places switch S3 closed and S2 in an open condition prior to pre-flash, so that the visible light sensing means VSLM output signal on line LD is fed to an aperture control comparator COMP2 via a manual film speed setting control taking the form of a step attenuator means AM.

During pre-flash the system control circuit SCC is actuated to an active condition to measure the visible light output sensing at the output of attenuator AM against an internal reference to determine whether or not the visible ambient illumination is adequate for exposure without flash assistance. If the ambient illumination is determined to be adequate, the sensing means control circuit SCC holds switch S3 in its closed condition and leaves switch S2 in its open condition, so that the visible light signal provided by the visible light sensing means VSLM is transmitted to the aperture control comparator COMP2 to control the setting of the aperture I by the aperture control means ACM. If, on the other hand, the visible light sensing means VLSM indicates inadequate ambient light, the system control circuit SCC reverses the setting of switches S2 and S3, to provide alternatively the signal stored in the sample and hold circuit SAH to the aperture compartor COMP2 via the attenuator AM so as to provide the control signal governing the actuation of the aperture control comparator during the aperture setting operation.

Initially the lens L and the aperture I are set at the extreme ends of their ranges, preferably by conventional mechanical linkages actuated by the film advance operation, to be released therefrom and driven to their final settings by the focus and aperture control means FCM and ACM responsively to depression of the shutter button SB. This operation also initially actuates the system control means SCM to initiate the pre-flash and subsequent operations. The pre-flash operation, including gating the sample and hold circuit SAH and selecting the appropriate sensing means to control the aperture control means ACM, are all virtually instantaneous operations with respect to movement of the aperture I and the lens L by their respective control means.

After the aperture and focus elements have both been set in their final position based upon the previously described sensing, the system control means actuates the shutter motor means SMM, most typically a simple spring shutter actuator of conventional design to actuate the shutter SH to a film exposing position, thereby closing switch contacts K1 and K2. Normally this will result in actuation of the trigger circuit TR2 to provide a scene illuminating flash of visible light for purposes of exposure; however, this trigger circuit pulse is disabled by a signal provided along line LG from the sensing control circuit output when that circuit is set to select the visible light sensing means as the aperture control signal, i.e. in those cases when no flash is needed.

The necessary power supply and trigger circuits for producing sequential flash pairs for such a system as described herein are well known in the art. One such system is disclosed in U.S. Pat. No. 4,256,995 issued to Ishida. Such circuits provide a necessary prerequisite for all aperture-setting pre-flash systems: The pre-flash and the exposure flash intensities must stand in a known fixed relationship to each other, so that the reflected pre-flash intensity may be used to establish the aperture setting for the main flash. This is routinely accomplished by sequentially discharging independent capacitors through a common flash tube.

Overall system power is derived from battery B, typically of order 9 volts, connected to provide full battery voltage VB to various elements of the system, as well as a regulated reduced output voltage VR produced by means of a Zener diode Z of order 5 volts connected to the unregulated output line through a ballast resistor R1. The battery B is connected to provide power to the system by means of a master switch MS which may take a variety of forms, including not only a conventional manually operated switch as indicated in FIG. 1 (see also FIG. 5), but also any one of a variety of time-out switches initially actuated to power the system for a finite period of time upon every slight depression of the shutter button SB. A ready light, preferably in the form of a light emitting diode LED, visually informs the operator that the power supply PS is fully charged and ready to carry out the exposure cycle.

For purposes that will subsequently be discussed iin detail, a general timing pulse is produced on line TL to synchronize various elements of the system. A latching pulse generator LPG produces a "1" to "0" transition on its output line TL responsive to the drop in voltage across the flash tube F when triggered by the pre-flash trigger circuit TR1, the timing line TL being held thereafter in a "0" state. The transition between the two states serves to actuate a variety of circuits, as will be discussed. The latching pulse generator LPG may be made in a variety of ways well known to those of ordinary skill in the art, the only requirement placed on this element being that the "1"—"0" transistion in its output be initiated by a negative edge trigger signal at the input as shown in FIG. 1, and to remain thereafter latched until reset. This latter operation may be done in a variety of ways most simply by switching means in the system control means SCM or by release of the shutter button SB.

Having been discussed in general function, the various subsystems of the camera will now be discussed in detail. The initial configurations of the system may be done by a variety of means, as for example by film advancing or manual shutter cocking operation, or by interrelated mechanical systems accomplishing both, or by a variety of other means well known to the art. Initially, before each exposure cycle, the lens L of FIG. 1 and the aperture iris I of FIG. 1 are placed at extreme ends of their respective ranges, the shutter is closed, the master switch is on, and the latching pulse generator LPG has its output initially set to a "1" state. Depression of the shutter button then initiates the exposure process.

Details of the automatic focussing system are best shown with reference to FIG. 2 in conjunction with FIG. 1. FIG. 2 shows the elements of the focus control means FCM and focus sensing means FSM as shown in functional form in FIG. 1. A focus drive means FDM is actuated by the system control means SCM to cause a rotating bridging contactor SC1 to traverse a plurality of arcuately disposed switching contacts as shown in FIG. 2. Initially with the focus drive means FDM in the starting position, the switching contactor SC1 is at an extreme clockwise position as shown in FIG. 2, and makes contact with none of the rotary switch contacts. Actuation of the focus drive means, which in the preferred embodiment is a spring motor (not shown), drives the lens L through its range of positions, simultaneously rotating the bridging contactor SC1 in a counterclockwise direction.

The initial contact of the moving contactor SC1 causes a bridging short between contacts K3 and K6. Recalling with reference to FIG. 1 that the timing line TL is initially placed in a "1" state, bridging of this pair of contacts causes a "1" state to be propagated from the timing line TL through resistor R16, then through contacts K3 and K6 to the input of trigger circuit TR1, here shown to be of the positive trigger type, to trigger the flash tube F of FIG. 1 via trigger electrode TE to generate the first flash (pre-flash) of light.

An immediate result is that the latching pulse generator LPG, deriving its input signal from the sudden drop in voltage across the flash tube F, causes the timing line TL to drop to a "0" state. Thus, having triggered the flash tube F to generate the pre-flash, the signal thereafter applied to R16 is a "0" state, and subsequent actuation of the trigger circuit TR1 cannot occur.

Thereafter the focus drive means FDM continues to drive the switching contactor SC1 to sequentially connect contact K5 to a series of contacts K7, K8, K9, K10, K11, K12, and finally K13 as the lens cell LC (FIG. 1) moves throughout its range. As will subsequently be discussed, an analog signal derived from this potentiometer network serves to terminate the rotation of the focuse drive means FDM, and thereby freeze the movement of the lens at an appropriate range setting as derived from a light sensing signal via line LA. Details of this scanning operation will temporarily be deferred.

Referring now to FIG. 4, showing details of the infrared sensing means IRSM and the sample and hold circuit SAH, which jointly serve to produce an analog range-indicating signal on line LA to be fed to comparator COMP1 of FIGS. 1 and 2 to govern the lens adjustment, the incident pre-flash pulse of reflected light from the illuminated scene strikes photodiode D1 biased by the regulated supply voltage VR through resistor R37 to drive the base of transistor Q3. Positive battery voltage VB is applied to the emitter of Q3, the collector being grounded through a sensitivity control R39. A feedback resistor R38 between collector and base of Q3 serves to provide bias stability to the system.

The light pulse signal from diode D1 is thus amplified by transistor Q3 to be fed from the collector thereof to output coupling network C4 and R40 to provide an analog pulse output signal to the input of the sample and hold circuit SAH. The light pulse signal enters the sample-and-hold circuit SAH to be fed through an analog gate S1, here functionally represented as a switch actuated to a closed position by a "1" state applied to the enabling terminal E thereof. Enabling terminal E of the analog gate S1 is driven by the timing line TL, which, as has previously been described, is initially in a "1" state, as a result of which the analog gate S1 is normally in a closed position to feed the output of the infrared sensing means IRSM to a storage capacitor CS connected between ground and the non-inverting terminal of an operational difference amplifier OA1. The output of the operational difference amplifier OA1 is fed back to the inverting terminal via an offset diode D4.

As long as the analog gate S1 is closed, the output of the sample-and-hold circuit supplied to line LA will replicate the output signal derived from the infrared sensing means IRSM; however, because of the blocking action of capacitor C4, the input voltage to the non-inverting input of operational amplifier OA1 is essentially zero in the absence of a light pulse signal, with the result that line LA idles near ground potential.

Upon excitation of the flash lamp F to provide the pre-flash light pulse, however, an analog light pulse is fed from the infrared sensing means through capacitor C4 to drive the non-inverting input of the amplifier OA1. Almost immediately after firing of the flash tube, and preferably in the immediate vicinity of the peak of the flash, the timing line pulse TL causes the analog gate S1 to be switched to an open condition, with the result that non-inverting input floats across capacitor CS, and the line LA is thus held at a value corresponding to the input signal level to the operational amplifier OA1 at the time of switching, to be held at this value throughout the remainder of the system cycle. Line LA is thus effectively frozen in a representation of the reflected infrared light pulse produced by the pre-flash operation. To achieve adequate freedom from drift, the operational amplifier OA1 must have a high input impedance, and is preferably of the field-effect transistor type.

Returning now to FIG. 2, the details of the focussing operation will now be considered in greater detail. A regulated voltage VR is supplied through resistor R15 to the central arcuate contact K4 disposed opposite radially disposed contacts K7, K8, K9, K10, K11, and K12. As the focus drive means FDM moves the lens and scans to drive the bridging contactor SC1 counterclockwise after have bridged the contacts K3 and K6 to initiate the pre-flash, sequential contact is next made between contact K4 and contact K7. A resistor R17 from contact K7 to ground serves to form the ground leg of an attenuator (potentiometer means) in combination with resistor R15. This reduced voltage developed on contact K4 is also fed to the non-inverting input of the differential comparator COMP1. The remaining radially disposed contacts in the series K8-K12 are similarly provided with grounding resistors R18-R23, the series of resistors R17-R23 being of progressively decreasing value.

Thus, a precisely defined series of voltage steps of decreasing value are fed to the input of the comparator COMP1 as the focus drive means drives the bridging contact SC1 counterclockwise. Ultimately a step is reached at which the signal to the non-inverting input is less than the range-dependent signal value applied to the inverting input via line LA, at which point the output of comparator COMP1 switches from a "1" to a "0", driving the base of transistor Q1 via R12 into a conducting condition. Current flows then from the battery supply VB through the emitter of transistor Q1, and thence from the collector thereof to actuate a focus latching means FLM, here symbolically represented as a solenoid SOL1, the onset of current through the solenoid causing an engaging pawl (not shown) to arrestingly engage the focus drive means to terminate further motion of the lens L (FIG. 1).

Transistor Q1 is held in this condition by an elementary latch consisting of resistor R13 from the collector of transistor Q1 through a tri-state inverter TS12 having a "0" state enabled condition applied to terminal E thereof, the output of the inverter feeding back to the base of transistor Q1 through resistor R14. The enable terminal E of the tri-state inverter TS12 is enabled via the timing line TL upon pre-flash, as a result of which, by the time the rotary contactor SC1 has reached its destination the tri-state element TS12 is enabled, whereupon the onset of current through the solenoid SOL1 causes a latching signal to be applied to the base thereof, so that transistor Q1 remains latched thereafter. A damping diode D3 across solenoid SOL1 serves to suppress dangerous transents in the circuit arising from inductive kick through the solenoid.

In the event that a matching condition is not achieved at the input of comparator COMP1 by the time contactor K12 has been engaged by the bridging contact SC1, the contact SC1 (still accompanied by lens motion) continues to the last contact pair, i.e. K5 and K13, serving to pull the base of transistor Q1 to ground by direct bridging short, thereby holding transistor Q1 on the "on" condition in this situation as well. This is the extreme weak illumination condition, and corresponds to a setting of the lens L for maximum (i.e. infinite) range.

It will be noted that seven focussing settings are indicated in FIG. 3, however they may be expanded at will to arbitrary number. A principal novel feature of the system is that the number of focussing steps can be increased virtually without limit without necessitating the employment of multiple memory storage means, the single sample and hold circuit SAH serving to provide a fixed reference for the step attenuator system.

FIG. 3 shows the details of the aperture control system. As in the case of a focus drive means FDM of FIG. 2, aperture drive means ADM responsive to the system control means in initially in an extreme clockwise position, driving a rotating bridging contactor SC2 therefrom in a counterclockwise direction upon initiation of the exposure cycle. The initial position of the bridging contactor SC2 is sufficiently advance of the first active contact pair, i.e. K20 and K22, that the pre-flash signal storage and latching operations are accomplished before initial sensing contact is made.

A position-responsive analog signal is produced at arcuate contact K20 to be fed to the non-inverting input of comparator COMP2. This is accomplished by means of an attenuator string (potentiometer means) bridging eight of the zone contacts K22–K29 and consisting of a series string of resistors R28, R29, R30, R31, R32, R33, R34, R35, and R36 establishing the potential at each of these contacts to sequentially decreasing values, similar to the case of the focussing system. As identically described in the case of the focussing system, a transistor Q2 is fired by a transition of the comparator COMP2 to drive its base negative, actuating aperture latch means ALM, similarly here shown in the form of a solenoid SOL2, to arrestingly freeze the rotation of the aperture drive means ADM to place the bridging contacts SC2 at an aperture setting corresponding to the input light level signal delivered to the inverting input comparator COMP2 via line LB. The operation of the latching circuitry involving the comparator COMP2 and the switching transistor SC2 is identical that of the focussing system of FIG. 2.

The origin of the sensing signal on line LB to control the aperture setting will next be described. As previously discussed with reference to FIG. 1, the sensing signal used to control the aperture drive means via line LB may optionally derived from the infrared sensing means IRSM using the sample-and-hold storage system SAH producing a range-dependent amplitude level on output line LA, the signal level being communicated to line LD by means of an analog gate S2, here symbolically represented as a switch actuated to a closed position on receipt of a "1" state applied to enabling terminal E thereof. Alternatively the light amplitude signal may be supplied to line LD from the visible light sensing means VLSM via output line LH through a similar analog gate S3.

With reference to FIG. 4 the visible light sensing means includes a photodiode D2 connected in photovoltaic mode to the inverting input of an operational amplifier OA2, the output of the amplifier being fed to drive output line LH through an offset diode D5 used for level restoration purposes. A feedback sensitivity control is formed by returning a fraction of the output signal through the slider of potentiometer R42 connected from the output of diode D5 to ground, the slider voltage being fed back to the inverting input of operational amplifier OA2 through resistor R41. By adjusting the position of the slider of resistor R42, the sensitivity of the visible light sensing means VLSM circuit can be adjusted.

The means whereby the decision is made to select either the infrared sensing means output or the visible light sensing means output will now be described. The sensing means control circuit SCC shown in FIG. 1 is portrayed in general functional form, the principal output elements being shown in the form of a pair of cross coupled nand gates NAND1 and NAND2 to form a flip-flop, the output terminals respectively driving the enabling terminals E of analog gate S2 and S3 in opposite phases. The cross coupled flip-flop pair NAND1 and NAND2 are initially set by the system control means by any one of a variety of means well known to the art so as to output a "1" state on line LF, thereby closing S3, and producing a conjugate "0" state on line LE, thereby opening switch S2.

Thus, before the pre-flash operation the output delivered to line LD is that developed by the visible light sensing means VLSM. The visible light sensing means VLSM output from LD is passed through the step attenuator means AM, having a plurality of output settings adjustable via rotor RO and corresponding to different film speeds to be used in the camera and manually adjustable from outside by rotary knob RO' as shown in FIG. 5 the attenuated signal so produced on line LB from the attenuator rotor is fed around through line LC through a low pass filter network R10 and C6 to actuate the inverting terminal of a threshold illumination comparator COMP3, the non-inverting terminal being supplied by a constant positive voltage indicated as VREF produced by fixed reference voltage means (not shown) within the system. The comparator output is then led to the input of a tri-state switch TS1 having an enabling terminal E which enables the tri-state to a conducting condition when a "0" is applied thereto via the timing line TL.

A functional connection is shown between the output of tri-state switch TS1 to the reset terminal, i.e. the left terminal, of gate NAND2. Before the pre-flashing of flash tube F, it will be recalled that the timing line TL remains in a "1" state, thereby disabling the tri-state switch TS1 until the first trigger pulse from trigger unit TR1 actuates the flash tube to produce the first pulse of light. During the pre-flash interval, at which time the signal on timing line TL drops to a "0" state, the tri-state swtich TS1 is actuated. At this time the flip-flop consisting of gates NAND2 and NAND1 will be actuated to an opposite state according to whether or not the visible light signal previously produced on line LD, and in attenuated form on line LC is sufficient to overcome the positive voltage supplied to the non-inverting input terminal of the threshold comparator COMP3.

If the visible light signal is sufficiently strong, the output of comparator COMP3 goes to a "0" state, to be inverted by the now enabled inverting tri-state switch TS1 to place a "1" on the reset terminal R of gate NAND2, thereby reversing the output phases of the two nand gates NAND1 and NAND2. If the ambient light signal delivered from line LC to the inverting input of comparator COMP3 is less than the applied reference voltage VREF, then the output of comparator COMP3 will be a "1" state, to be inverted at the output of the tri-state inverter TS1 to apply a "0" to terminal R of the nand gate NAND2, thereby reversing the output phasing of these two gates, and connecting alternatively the output of the sample-and-hold circuit SAH to line LD to supply therefrom the sensing signal upon which the aperture control means ACM adjusts the lens aperture for exposure.

Thus, depending upon whether the visible light sensing signal D is adequate for film exposure with the aperture I set at maximum transmission, or whether supplementary flash is necessary during the main exposure flash, the light sensing signal which drives the aperture control means through line LB is alternatively derived from the visible light sensing means VLSM or the infrared sensing means IRSM by selective actuation of the two analog gate switch S2 and S3. The purpose of the low pass filter R10 and C6 feeding the visible light sensing means output around to the inverting input of the light level comparator COMP3 is to prevent the pre-flash pulse detected by the visual light sensing means from passing through to play a role in the comparison process. The value of reference voltage VREF applied to the non-inverting input of the light level comparator COMP3 is chosen such that triggering occurs for all ambient light sensings indicating a light level inadequate for film exposure with the aperture I at its maximum open setting.

The switching sequence just described is initiated by the transition from a "1" to a "0" on the timing line TL, which has previously been described as a condition concurrent with the generation of the pre-flash light pulse arising from the touching of the bridging contactor SC1 (FIG. 2) bridging across contacts K3 and K6 during the inital phase of the focus scanning operation. Both the focus drive means FDM of FIG. 2 and the aperture drive means ADM of FIG. 3 initiate their scanning substantially simultaneously, and the contact arrangement associated with the aperture drive means is such that bridging contact is maintained between elements K20 and K22 for a time sufficiently long that the previously mentioned actuation of switches S2 and S3, as well as the sample-and-hold latching via analog gate S1 can be carried out. These operations, however, merely require a matter of a few milliseconds, a time which is virtually instantaneous with respect to the gross mechanical motions of the two drive means. The latched conditions of the three analog gates S1, S2, and S3 having been established, the aperture drive means ADM (FIG. 3) and focus drive means FDM (FIG. 2) then proceed to carry out their respective scanning operations until latched by their respective latching means.

The interrelationship between the two photosensing signals will now be considered in more detail. The signal output of the visible light sensing means VLSM is set by the sensitivity control R42 and the gain of the operational amplifier OA2, and is proportional to the scene brightness under ambient illumination. The attenuator string resisters R28-R36 of the aperture control (FIG. 3) are fixed so as to provide analog output signals that are linearly related to the light transmission value corresponding to each aperture setting. A match between the two signals terminates the aperture scanning operation. Attenuator means AM inserts an attenuation related to film speed.

The reference voltage VREF, typically derived from a fixed stable voltage source, e.g. a fixed attenuator (not shown) powered by the regulated voltage VR, is chosen such that the switches S2 and S3 are in the ambient sensing configuration whenever the voltage developed at rotor RO of the attentuator means AM exceeds the analog step voltage corresponding to fully open lens aperture.

The signal output of the infra-red light sensing means IRSM, governed by the setting of potentiometer R39 and the gain of transistor Q3, is proportional to the scene brightness under pre-flash light, as is the signal from the sample-and-hold circuit SAH through operational amplifier OA1. The overall gain of this system is adjusted such that the signal output level delivered to line LA corresponds to the scene brightness that will later be produced by the main flash. This adjustment is based, among other things, on the known ratio of infra-red pre-flash output light level to exposure flash visible output light level. By this matching, the two output sensing signals from the infra-red sensing circuitry and the visible light sensing circuitry are interchangeable as seen from the aperture control system.

Finally, having established the appropriate system gains and signal levels to control the aperture system, the infra-red pre-flash output signal levels are used to control the focussing system by choosing the values of the attenuator resisters R15, R17-R23 to produce analog signals for the various lens positions corresponding to the various focussing distance zones, the magnitude of these output voltages being thus established such that the lens setting is appropriate for each signal output level on line LA corresponding to a given range zone. Thus, the infra-red sensing signal amplitude serves to govern focus as well.

Upon completion of latching by both the aperture latching means ALM and the focus latching means FLM, a shutter motor means (FIG. 1) is actuated to operate the shutter SH through an exposure cycle. This actuation may be accomplished by a variety of means, including gate sensing simultaneous energization of solenoid SOL1 and SOL2 so as to subsequently to energize, for example, a solenoid release of a conventional spring shutter motor, or alternatively such shutter actuation may be done by direct mechanical coupling to the mechanical latch actuators (not shown) which arrest the aperture drive means ADM and focus drive means FDM. Alternatively, a variety of other means well known in the art may be employed to actuate the shutter motor.

As has previously been described, actuation of the shutter motor means SMM (FIG. 1) to actuate the shutter SH through an exposure cycle results in closure of the synchronizer contacts K1 and K2, thereby firing the trigger circuit TR2 to provide scene illuminating light from flash bulb F during film exposure. However, the gate switches S2 and S3 are at this time in a latched configuration indicating whether or not such flash illumination is necessary, and thus the circuit is arranged such that only if switch S2 is in a closed condition (low light level), i.e. with a "1" state on the enabling terminal E thereof (see FIG. 1), will a positive enabling signal be fed to the enabling terminal E of trigger circuit TR2 via line LG. If the ambient light is determined to be adequate for exposure, such enabling of trigger circuit TR2 will not occur, and no scene illuminating flash of light will be generated during the film exposure process.

FIG. 5 shows an external view of a representative camera C employing the principles of the present invention. Windows W1 and W2 admit light to the two light sensing diodes D1 and D2 (not shown), window W3 is the viewfinder window, and WF is the flash window. A film speed adjust knob RO' is connected to drive the rotor RO of the attenuator means AM (FIGS. 1 and 3). The shutter button SB is shown located immediately in front of a master switch MS' coupled to actuate the master switch MS of FIG. 1. More advanced systems may eliminate this control entirely, as by actuating the system to a power-up condition for a period of a minute or so upon slight depression of the shutter button SB.

The system previously described uses a single sample-and-hold memory circuit SAH consisting principally of the analog gate switch S1, storage capacitor CS, and the operational amplifier OA1. Since the scanning times of the aperture drive means ADM (FIG. 4) and the focus drive means FDM (FIG. 3) require scanning times extending to as much as 100 milliseconds, certain conditions must be placed upon the operational amplifier OA1 to preserve the peak reflected light signal stored in compacitor CS without substantial sag during this period. Therefore a well known prerequisite of the operational amplifier OA1 is that it must have exceptionally high input impedance, and for this reason a field effect transistor circuit is employed for this element.

By using a single such memory circuit to store the information, and by use of single potentiometric comparison scanning systems for each of the focus and the aperture controls, a substantial overall economy is achieved, particulary in scanning systems requiring large numbers of scanning zones to provide refined settings, as compared with multiple comparison and memory systems which use individual comparison and memory circuits associated with each contact. This latter approach is the subject of a copending application and is currently used in a line of cameras manufactured under the trade name of "Autofocus Model 1090" distributed by Ansco Phot-Optical Products Corp., Elk Grove Village, Ill. Thus, in such a multi-zone system, an amplitude comparator and a flip-flop latch are associated with each contact. The comparators each have one input biased by a resistive divider to set them serially to higher threshold values. The other input terminals of the comparators are fed in common by the pre-flash photosensor, resulting in actuation of all comparators which are biased below the peak signal value. Each comparator feeds an associated flip-flop, with the result that all flip-flops serving the actuated comparators are set to a signal-indicating condition, and the remainder are not. Each flip-flop is connected to a zone contact for scanning in sequence, the scanning process terminating when an un-set flip-flop is first encountered.

In broad concept the present system is clearly similar; however, its cost economics are substantially improved. The prior art requres for each additional zone contact one extra resistor (for the biasing string), one comparator, and one flip-flop latch (memory means). The present disclosure requires one extra attenuator resistor per contact, plus one analog sample-and-hold memory circuit, and two comparators if both focus and aperture are to be controlled. It is clear that as the number of zones is increased, the system of the present disclosure is ultimately substantially less costly.

The use of sample-and-hold memory circuits in focus or aperture control systems is also disclosed in United Kingdom Patent Application GB No. 2084750A. This reference, however, discloses use of such means to disable a light photosensing system used during an exposure evaluation phase to terminate the exposure (Page 6, Lines 66-75). The function of such a circuit in the above-referenced system is not to capture and hold the flash pulse, but to block it from interfering with a concurrent exposure integration system. There is thus no relationship between the use of such a memory element in the present system and in the above-cited reference.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to a particular embodiment disclosed as the best mode contemplated for carrying out the invention, but that the inventions will include all embodiments falling within the scope of the appended claims.

I claim:

1. In an electrically operated camera having flash-lamp means, aperture setting means for controllably setting the aperture over a range of values between limit settings, range determining light sensing means for providing control signals from object-reflected flash light, shutter means for exposing the film when opened, manually operable control means which when operated initially operates said flash lamp means before the shutter means is opened to generate an object-reflected range determining flash of light following which the shutter means is opened, flash lamp actuating means for energizing said flash lamp means to provide a scene-illuminating flash of light when said shutter means is opened and flash lamp illumination of an object is desired, said scene-illuminating flash of light and said range-determining flash of light having a fixed predetermined intensity relationship with respect to each other, said camera further including aperture drive means for effecting a scanning movement of said aperture setting means from an initial position responsively to the operation of said manually operable control means, and aperture setting position-indicating means driven with said aperture setting means for providing progressively varying signals indicative of the instantaneous aperture settings thereof, the improvement wherein said camera further comprises:

single sample-and-hold memory means associated with said first light sensing means and responsive to the output therefrom when receiving the object-reflected range-determining flash of light for storing and holding a range-indicating signal indicative of the output of said range-determining light sensing means, the stored value of said sample-and-hold memory means for various object ranges and the signals generated by said aperture position-indicating means representing the various setting of said aperture setting means being correlated to the object range value involved for proper exposure of the object to be photographed at the range involved;

aperture setting movement terminating means responsive to said range-indicating signals and said aperture position-indicating means signals for terminating movement of said drive means when the aperture setting involved is that needed for the range indicated by the control signal stored in said sample-and-hold memory means; and ambient light sensing means for providing a control signal indicative of the ambient illumination of the object to be photographed, and control means responsive to said ambient illumination-indicating control signal indicating a relatively low ambient light condition where there is need for flash lamp illumination for rendering said movement terminating means for said aperture setting drive means responsive to said stored signal of said sample-and-hold memory means so that the aperture setting is determined by the range of the object to be illuminated by flash light, said control means being responsive to said ambient illumination-indicating signal indicating a relatively high ambient illumination where no flash lamp illumination is necessary for rendering said movement terminating means for said aperture setting drive means responsive to the output of said ambient light sensing means, so that the aperture setting is determined by ambient light conditions.

2. The camera of claim 1 further including focus setting means for controllably setting the lens focus distance over a range of values between limit settings;

focus setting drive means for effecting a scanning movement of said lens focus setting means from an initial position responsively to the operation of said manually operable control means;

focus setting position-indicating means driven with said focus setting means for providing progressively varying signals indicative of the instantaneous focusing settings thereof, the stored signal of said sample-and-hold memory means for various object ranges and the signals generating by said focus position-indicating means representing the various focus settings of said focus setting means being correlated to the object range values involved for proper focusing of the object to be photographed at the range involved; and focus setting movement terminating means responsive to said range indicating signals and said focus setting position-indicating mean signals for terminating movement of said focus drive means when the focus setting involved is that needed for the range indicated by the control signal stored in said sample-and-hold memory means.

3. The camera of claim 2 wherein said aperture setting and focus setting drive means, said aperture setting and focus setting position-indicating means, and said aperture setting and focus setting movement terminating means are respectively separate and distinct independently operating means, so that the variation of the range correlated signals of the separate position-indicating means and the position of the aperture and focusing setting means they represent are different from one another.

4. The camera of claim 3 wherein said sample-and-hold memory means stores a signal indicative of the peak output of said first light sensing means.

5. The camera of claim 4 wherein said sample-and-hold memory means includes a storage capacitor and an analog gate means interposed to selectively couple the output from said first light sensing means to said capacitor, said gate means being operated during said range determining flash of light from a closed signal-passing condition to an open signal-interrupting condition so as to store in said capacitor said signal indicative of the peak output of said light sensing means.

6. The camera of claim 3 wherein the same aperture setting position-indicating means is used for flash or ambient illumination operation and said ambient light sensing means provides control signals which have the same values as the stored range indicating sample-and-hold signals requiring for flash illumination aperture settings corresponding to that required for the levels of ambient illumination involved.

7. The camera of claim 6 wherein said progressively varying signals are signals which vary in amplitude, and said aperture setting and focus setting terminating means include separate signal amplitude comparison means which are triggered into a drive terminating mode when the setting position-indicating means signal and its associated range signal or ambient illumination control signal to which the comparison means is to respond reaches a state of comparison.

8. The camera of claim 7 wherein there is interposed between the aperture controlling range signal output of said sample-and-hold ambient light sensing means and the comparison means of the aperture setting movement terminating means a signal amplitude modifying means for modifying said signals to provide means for adapting the operation of said camera to various film speeds.

9. The camera of claim 8 wherein said amplitude modifying means includes attenuator means for controllably attenuating control signals communicated from said first range determining light sensing means and said ambient light sensing means to said aperture movement terminating means so as to controllably terminate aperture movement at proper settings for different film speeds.

10. The camera of claim 9 wherein said attenuator means includes potentiometer means manually operable stepwise to a plurality of fixed settings having differing control signal attenuation ratios.

11. The camera of claim 3 wherein the position-indicating means for said aperture setting means and said lens focussing setting means comprises separate potentiometer means, and a DC voltage source applied across each said potentiometer means, the movable contact means of each potentiometer means being driven synchronously with the associated aperture or focus setting means, so that the electrical potential of said contact means provides signals indicative of the settings thereof.

12. The camera of claim 11 wherein each said potentiometer means includes a tapped potentiometer having a plurality of tap-off points identifying different progressively spaced focus and aperture setting zones, and the associated movable contact means are driven into sequential contacting engagement therewith to provide said setting indicating signals as a series of voltage steps of progressively varying amplitude.

13. The camera of claim 2 wherein said means for generation of a range-determining flash of light generates said flash responsively to movement of one of said setting means from said initial position thereof.

14. The camera of claim 1 wherein said aperture setting position-indicating means comprises potentiometer means, and a DC voltage source applied across said potentiometer means, the movable contact means of said potentiometer means being driven synchronously with the associated setting means, so that the electrical potential of said contact means provides signals indicative of the settings thereof.

15. The camera of claim 14 wherein said potentiometer means includes a tapped potentiometer having a plurality of tap-off points identifying different progressively spaced focus and aperture setting zones, and the associated movable contact means are driven into sequential contacting engagement therewith to provide said setting indicating signals as a series of voltage steps of progressively varying amplitude.

16. The camera of claim 1 wherein the same aperture setting position-indicating means is used for flash or ambient illumination operation and said ambient light sensing means provides control signals which have the same values as the stored range indicating sample-and-hold signals requiring for flash illumination aperture settings corresponding to that required for the levels of ambient illumination involved.

17. The camera of claim 16 wherein said progressively varying signal are signals which vary in amplitude, and said movement terminating means include signal amplitude comparison means which are triggered into a drive terminating mode when the setting position-indicating means signal and the control signal to which the comparison means is to respond reach a given state of comparison.

18. The camera of claim 17 wherein there is interposed between the aperture controlling range signal output of said sample-and-hold ambient light sensing means and the comparison means of the aperture setting movement terminating means a signal amplitude modifying means for modifying said signals to provide means for adapting the operation of said camera to various film speeds.

19. The camera of claim 18 wherein said amplitude modifying means includes attenuator means for controllably attenuating control signals communicated from said first range determining light sensing means and said ambient light sensing means to said aperture movement terminating means so as to controllably terminate aperture movement at proper settings for different film speeds.

20. The camera of claim 19 wherein said attenuator means includes potentiometer means manually operable stepwise to a plurality of fixed settings having differing control signal attenuation ratios.

21. The camera of claim 1 wherein said sample-and-hold memory means stores a signal indicative of the peak output of said first light sensing means.

22. The camera of claim 21 wherein said sample-and-hold memory means includes a storage capacitor and an analog gate means interposed to selectively couple the output from said first light sensing means to said capacitor, said gate means being operated during said range determining flash of light from a closed signal-passing condition to an open signal-interrupting condition so as to store in said capacitor said signal indicative of the peak output of said light sensing means.

* * * * *